(12) United States Patent
Cho

(10) Patent No.: US 9,374,549 B2
(45) Date of Patent: Jun. 21, 2016

(54) HEAD MOUNTED DISPLAY AND METHOD OF OUTPUTTING AUDIO SIGNAL USING THE SAME

(71) Applicant: LG ELECTRONICS INC., Seoul (KR)

(72) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 472 days.

(21) Appl. No.: 13/686,596

(22) Filed: Nov. 27, 2012

(65) Prior Publication Data

US 2014/0118631 A1   May 1, 2014

(30) Foreign Application Priority Data

Oct. 29, 2012   (KR) .................. 10-2012-0120312

(51) Int. Cl.
| | |
|---|---|
| *G09G 5/00* | (2006.01) |
| *H04N 5/60* | (2006.01) |
| *G06F 3/16* | (2006.01) |
| *H04N 13/04* | (2006.01) |
| *G06F 3/01* | (2006.01) |
| *G06F 3/14* | (2006.01) |
| *H04R 5/04* | (2006.01) |
| *H04S 7/00* | (2006.01) |
| *H04N 21/41* | (2011.01) |
| *H04N 21/4223* | (2011.01) |
| *H04N 21/4363* | (2011.01) |
| *H04N 21/439* | (2011.01) |
| *H04N 21/462* | (2011.01) |
| *H04N 21/485* | (2011.01) |
| *G02B 27/01* | (2006.01) |
| *H04R 1/02* | (2006.01) |
| *H04R 5/033* | (2006.01) |
| *G02B 27/00* | (2006.01) |

(52) U.S. Cl.
CPC .............. *H04N 5/602* (2013.01); *G02B 27/017* (2013.01); *G06F 3/013* (2013.01); *G06F 3/1423* (2013.01); *G06F 3/167* (2013.01); *H04N 13/0468* (2013.01); *H04N 21/4122* (2013.01); *H04N 21/4126* (2013.01); *H04N 21/4223* (2013.01); *H04N 21/4398* (2013.01); *H04N 21/43637* (2013.01); *H04N 21/4622* (2013.01); *H04N 21/4852* (2013.01); *H04R 5/04* (2013.01); *H04S 7/30* (2013.01); *G02B 27/0093* (2013.01); *G02B 2027/0178* (2013.01); *G05B 2219/35503* (2013.01); *H04R 1/028* (2013.01); *H04R 5/033* (2013.01); *H04R 2420/07* (2013.01); *H04R 2460/07* (2013.01); *H04S 2400/11* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 6,243,476 | B1 * | 6/2001 | Gardner ....................... | 381/303 |
| 8,086,287 | B2 * | 12/2011 | Mooney .................. | G08B 1/08 |
| | | | | 455/556.1 |
| 8,183,997 | B1 * | 5/2012 | Wong .................... | G01S 3/8036 |
| | | | | 340/4.4 |
| 8,941,560 | B2 * | 1/2015 | Wong et al. ........................ | 345/8 |

(Continued)

FOREIGN PATENT DOCUMENTS

| | | |
|---|---|---|
| KR | 10-2011-0067471 A | 6/2011 |
| WO | WO 2010/099453 A1 | 9/2010 |
| WO | WO 2012/101720 A1 | 8/2012 |

*Primary Examiner* — Dismery Mercedes

(74) *Attorney, Agent, or Firm* — Birch, Stewart, Kolasch & Birch, LLP

(57) ABSTRACT

The invention relates to a head mounded display that outputs an audio signal of an external digital device according to whether the audio signal is directional output signal.

18 Claims, 15 Drawing Sheets

(56) References Cited

U.S. PATENT DOCUMENTS

| | | | |
|---|---|---|---|
| 9,134,949 B2 * | 9/2015 | Kim | H04N 5/23293 |
| 9,147,290 B2 * | 9/2015 | Kim | G06T 19/006 |
| 9,213,405 B2 * | 12/2015 | Perez | H04N 21/25891 |
| 2002/0068610 A1 | 6/2002 | Anvekar et al. | |
| 2002/0098878 A1 | 7/2002 | Mooney et al. | |
| 2003/0020707 A1 | 1/2003 | Kangas et al. | |
| 2003/0223602 A1 * | 12/2003 | Eichler | H04S 3/004 381/309 |
| 2006/0284791 A1 * | 12/2006 | Chen | G06F 3/011 345/8 |
| 2008/0169998 A1 | 7/2008 | Jacobsen et al. | |
| 2010/0079356 A1 * | 4/2010 | Hoellwarth | G02B 27/017 345/8 |
| 2011/0153044 A1 * | 6/2011 | Lindahl | G06F 3/167 700/94 |
| 2011/0213664 A1 * | 9/2011 | Osterhout | G02B 27/017 705/14.58 |
| 2011/0228983 A1 * | 9/2011 | Matsuda | G06F 3/167 382/103 |
| 2012/0115543 A1 | 5/2012 | Lin | |
| 2012/0154557 A1 | 6/2012 | Perez et al. | |
| 2012/0162362 A1 * | 6/2012 | Garden | H04N 13/0468 348/42 |
| 2012/0206452 A1 * | 8/2012 | Geisner | G02B 27/017 345/419 |
| 2012/0327116 A1 * | 12/2012 | Liu | G09G 5/377 345/633 |
| 2013/0293586 A1 * | 11/2013 | Kaino | G08G 1/005 345/633 |
| 2014/0002496 A1 * | 1/2014 | Lamb et al. | 345/633 |
| 2014/0071288 A1 * | 3/2014 | Kim | 348/158 |
| 2015/0379777 A1 * | 12/2015 | Sasaki | A63F 13/211 345/633 |

\* cited by examiner

HEAD MOUNTED DISPLAY AND METHOD OF OUTPUTTING AUDIO SIGNAL USING THE SAME

CROSS REFERENCE TO RELATED APPLICATION

This nonprovisional application claims the benefit of Patent Application No. 10-2012-0120312 filed in Republic of Korea, on Oct. 29, 2012. The entire contents of the above application is hereby incorporated by reference.

TECHNICAL FIELD

The present invention relates to a head mounted display (HMD) and a method of outputting an audio signal using the same. More particularly, the invention relates to an HMD that outputs an audio signal of an external digital device according to whether the audio signal is directional output signal.

BACKGROUND ART

A head mounted display (HMD) refers to a digital device worn on the head of a user like glasses and configured to be provided with multimedia content. As digital devices are miniaturized, various wearable computers are being developed and the HMD is widely used. The HMD not only executes a simple display function but also provides various conveniences to users by being combined with augmented reality technology, N screen technology, etc.

The HMD can be used in connection with various external digital devices. The HMD can output content of an external digital device by communicating with the external digital device and receive user input for the external digital device or perform work in connection with the external digital device.

DISCLOSURE

Technical Problem

An object of the present invention is to output an audio signal of an external digital device connected to an HMD through the HMD. The present invention provides a vivid sound to a user through the HMD.

An object of the present invention is to systematically provide an audio signal of at least one external digital device to a user. Specifically, the present invention determines an external digital device in which a user is interested from among one or more external digital devices connected to an HMD, and allows the user to concentrate on listening an audio signal output from the external digital device.

Technical Solution

According to an aspect of the present invention, a head mounted display (HMD) includes: a processor for controlling operation of the HMD; an audio output unit for outputting audio according to a command of the processor, the audio output unit including a left channel output unit and a right channel output unit; a sensor unit for detecting at least one external digital device connected to the HMD and transmitting whether at least one external digital device is connected to the HMD to the processor; and a communication unit for transmitting/receiving data to/from the external digital device according to a command of the processor, wherein the processor receives an audio signal of the external digital device, determines whether the received audio signal is directional output signal, and detects location information of the external digital device corresponding to the audio signal when the received audio signal is directional output signal, wherein the location information representing the relative location of the external digital device with respect to the HMD, detects a location state of the external digital device based on the location information of the external digital device, wherein the location state including a first state in which the external digital device is located within a predetermined view angle of the HMD and a second state in which the external digital device is not located within the view angle of the HMD, wherein the processor outputs the audio signal based on the detected location information and location state of the external digital device, the audio signal output including a left channel output and a right channel output, at least one of the left channel output and the right channel output being controlled based on the location information and the location state of the external digital device.

According to another aspect of the present invention, a method of outputting an audio signal using an HMD includes: receiving an audio signal of at least one external digital device connected to the HMD; determining whether the received audio signal is directional output signal; detecting location information of the external digital device corresponding to the audio signal when the audio signal is directional output signal, the location information representing the relative location of the external digital device with respect to the HMD; detecting a location state of the external digital device based on the location information of the external digital device, the location state including a first state in which the external digital device is located within a predetermined view angle of the HMD and a second state in which the external digital device is not located within the view angle of the HMD; and outputting the audio signal based on the detected location information and location state of the external digital device, the audio signal output including a left channel output and a right channel output, at least one of the left channel output and the right channel output being controlled based on the location information and the location state of the external digital device.

According to the embodiments of the present invention, the HMD can output an audio signal of an external digital device and provide a vivid sound according to the location of the external digital device. That is, a user can feel as if he/she listens the audio signal of the external digital device, output from the direction in which the external digital device is located.

Furthermore, according to the embodiments of the present invention, the HMD can determine an external digital device located on the line of sight of the user according to whether the external digital device is located within the view angle of the HMD, and control the output level of an audio signal of each external digital device based on the determined external digital device. Accordingly, the HMD of the present invention can select an audio signal of an external digital device, in which the user is interested, and adjust the output level of the audio signal.

According to the embodiments of the present invention, the user can be provided with audio signal outputs of a plurality of external digital devices through the HMD. In this case, the audio signal outputs can be provided as 3D audio signals to the user depending on locations of the external digital devices corresponding to the audio signal outputs.

In addition, the HMD can decrease the output level of an output signal of an external digital device that is not located within the view angle thereof or block output of the audio signal. In this case, the HMD can prevent interference among audio signal outputs of a plurality of external digital devices, and the user can select and listen to an audio signal output from an external digital device at which the user looks.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Although the terms used in the present invention are selected from generally known and used terms, the terms can be changed according to the intention of an operator, customs, or the advent of new technology. Some of the terms mentioned in the description of the present invention have been selected by the applicant at his or her discretion, the detailed meanings of which are described in relevant parts of the description herein. Therefore, the present invention must be understood, not simply by the actual terms used but by the meanings of each term lying within.

Figure 1:
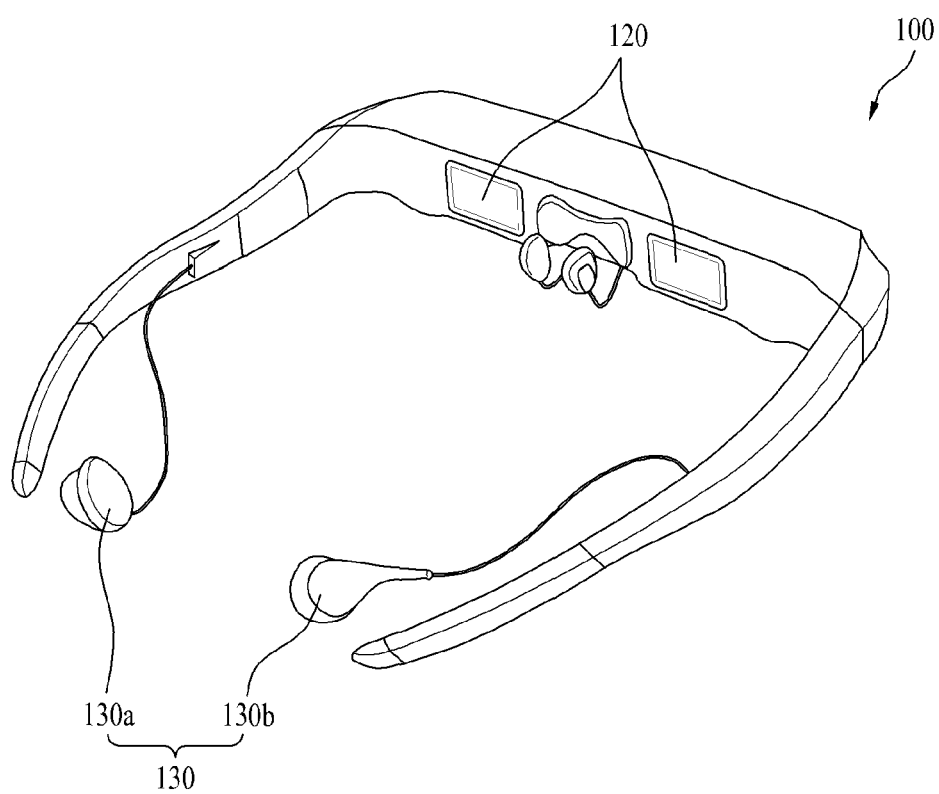
FIG. 1 illustrates an HMD according to an embodiment of the present invention.

FIG. 1 illustrates an HMD 100 according to an embodiment of the present invention. The HMD 100 according to an embodiment of the present invention includes a display unit 120 and an audio output unit 130.

The display unit 120 displays an image according to a control command of a processor (not shown) of the HMD 100. In the present embodiment of the invention, the display unit 120 includes a display screen and forms an image on the display screen. Alternatively, the display unit 120 does not include the display screen and can project an image to a specific region in front of the HMD 100.

The audio output unit 130 of the HMD 100 includes a left channel output unit 130a and a right channel output unit 130b. The left channel output unit 130a and the right channel output unit 130b respectively output a left channel and a right channel of an audio signal. In the present embodiment of the invention, the audio output unit 130 can include an output unit that outputs an audio signal as an audible frequency, such as a speaker, an earphone, etc. and a control module for controlling the output unit.

Figure 2:
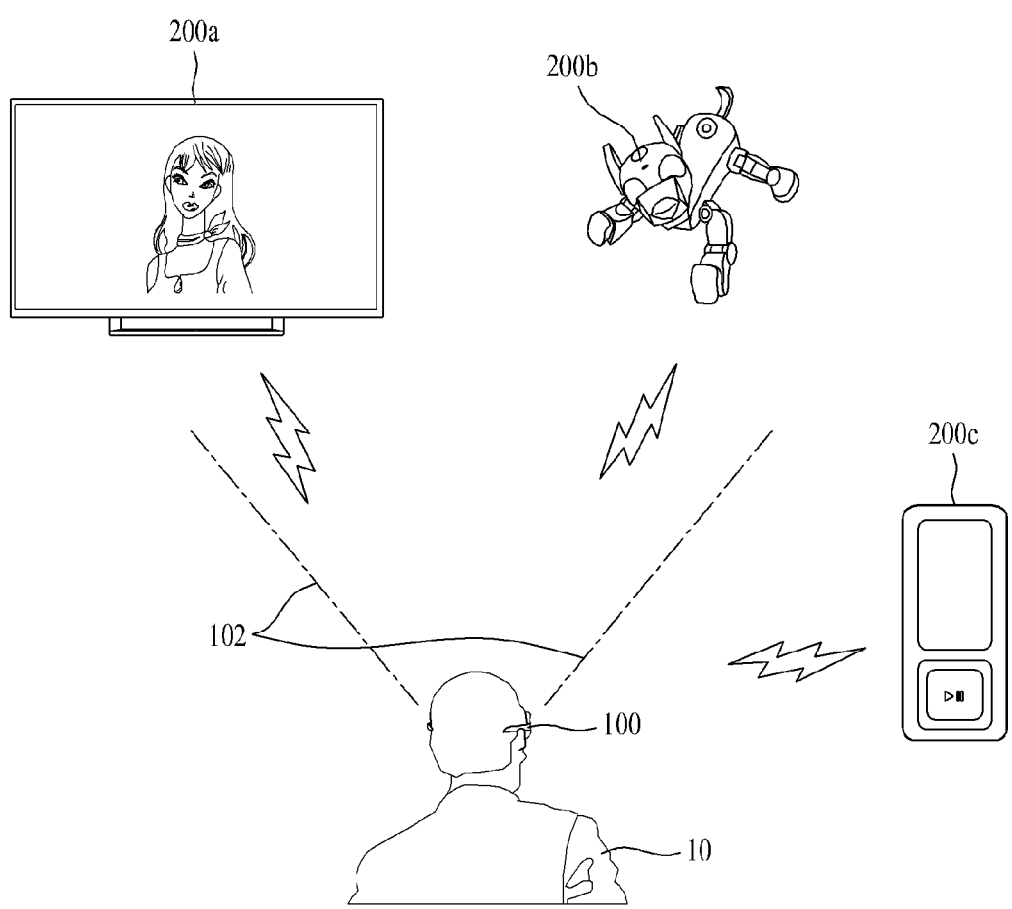
FIG. 2 illustrates an HMD and external digital devices connected to the HMD according to an embodiment of the present invention.

FIG. 2 shows the HMD 100 and external digital devices 200a, 200b and 200c connected to the HMD 100. The HMD 100 can be connected to at least one of external digital devices 200a, 200b and 200c to transmit/receive data to/from the external digital devices 200a, 200b and 200c. Particularly, the HMD 100 can receive audio signals of the external digital devices 200a, 200b and 200c, and output the audio signals through the audio output unit (not shown).

In the embodiments of the present invention, external digital devices include various types of digital devices capable of transmitting audio signals to the HMD 100. For example, external digital devices include a smartphone, a PC, a PDA (Personal Digital Assistant), a notebook computer, a tablet PC, a TV receiver, a music player, etc. In addition, the external digital devices include various digital devices that can transmit audio signals. In the embodiment of FIG. 2, the external digital device 200a is a TV receiver corresponding to one of the non-tablet devices, the external digital device 200b is a robot dog, and the external digital device 200c is a music player corresponding to one of the tablet devices. In the embodiments of the present invention, external digital devices can include a communication unit (not shown) and transmit/receive data such as audio signals to/from the HMD 100 through the communication unit.

The HMD 100 can operate in connection with one or more external digital devices 200a, 200b and 200c. Additional pairing or a communication connection can be performed to connect the HMD 100 to each of the external digital devices 200a, 200b and 200c and can be performed according to user input through the HMD 100 or each of the external digital devices 200a, 200b and 200c. For example, the HMD 100 can provide a button or a user interface for paring or communication connection with the external digital devices 200a, 200b and 200c. A user can perform pairing or communication connection of the HMD 100 and the external digital devices 200a, 200b and 200c through user input using the button or user interface.

In the embodiments of the present invention, the HMD 100 transmits/receives data to/from the external digital devices 200a, 200b and 200c using various wired/wireless communication means. NFC (Near Field Communication), ZigBee, infrared communication, Bluetooth, WiFi, etc. can be used as wireless communication means. However, the present invention is not limited thereto. The HMD 100 can be connected to the external digital devices 200a, 200b and 200c using one of the aforementioned communication means or a combination thereof to perform communication.

The HMD 100 can output an audio signal using the audio output unit 130 shown in FIG. 1. For example, the HMD 100 can output an audio signal of content which is executed according to a command of the processor (not shown), and output an audio signal corresponding to a user interface provided by the HMD 100. Furthermore, the HMD 100 receives audio signals of the external digital devices 200a, 200b and 200c connected thereto, and outputs the audio signals. Here, the audio signals of the external digital devices 200a, 200b and 200c can be output through the HMD 100 instead of being directly output through the external digital devices 200a, 200b and 200c.

The HMD 100 detects location information of the external digital devices 200a, 200b and 200c, and outputs the audio signals of the external digital devices 200a, 200b and 200c based on the detected location information. The location information refers to the relative location of each of the external digital devices 200a, 200b and 200c with respect to the HMD 100, that is, distance and direction information. The HMD 100 can detect the location information of the external digital devices 200a, 200b and 200c using various means. According to the present embodiment of the invention, the HMD 100 can adjust the output levels of the audio signals of the external digital devices 200a, 200b and 200c based on the detected location information.

The HMD 100 can have a predetermined view angle 102. The view angle 102 is a predetermined range corresponding to the field of vision of a user 10 wearing the HMD 100 and includes an area within a predetermined angle in front of the HMD 100. According to the present embodiment of the invention, the HMD 100 can detect whether the external digital devices 200a, 200b and 200c connected thereto are located within the view angle 102. That is, the HMD 100 can detect location states of the external digital devices 200a, 200b and 200c interworking with the HMD 100. In the present embodiment of the invention, the location states can include a first state in which the external digital devices 200a, 200b and 200c are located within the view angle 102 and a second state in which the external digital devices 200a, 200b and 200c are not located within the view angle 102. According to the embodiment of the present invention, the HMD 100 can determine the location states of the external digital devices 200a, 200b and 200c using the detected location information of the external digital devices 200a, 200b and 200c.

According to an embodiment of the present invention, the HMD 100 can output the audio signals of the external digital devices 200a, 200b and 200c based on the detected location states of the external digital devices 200a, 200b and 200c. In this manner, the HMD 100 can control output of the audio signals of the external digital devices 200a, 200b and 200c based on at least one of the detected location information and location states of the external digital devices 200a, 200b and 200c. This will be described in detail below.

FIGS. 3 to 6 show embodiments in which the HMD 100 outputs audio signals of at least one of external digital devices 200a, 200b and 200c shown in FIG. 2. In the embodiments of FIGS. 3 to 6, the HMD 100 is connected to the external digital devices 200a, 200b and 200c. Also, in the embodiments of FIG. 3 to 6, audio signals of the external digital devices 200a and 200b are set such that they are output directionally (directivity 'on'), and an audio signal of the external digital device 200c is set such that it is output non-directionally (directivity 'off'). In the present invention, directional output refers to control of output of an audio signal in response to the location of an external digital device corresponding to the audio signal. That is, if a user listens an audio signal that is output directionally, the user feels as if he/she listens the audio signal output from the direction in which the external digital device corresponding to the audio signal is located. Non-directional output refers to output of an audio signal at a predetermined output level regardless of the location of the external digital device corresponding to the audio signal.

In the embodiments of the present invention, it is possible to determine through various methods whether an audio signal is directional output signal. For example, the HMD 100 can receive additional data corresponding to the audio signals of the external digital devices 200a, 200b and 200c, and determine whether the audio signals are directional output signal from the additional data. Otherwise, the HMD 100 can determine whether the output signals are directional output signal based on device information of the external digital devices 200a, 200b and 200c. Whether the audio signals of the external digital devices 200a, 200b and 200c are directional output signal can be predetermined according to device type. Alternatively, whether the audio signals of the external digital devices 200a, 200b and 200c are directional output signal can be individually determined according to additional input or setting of the user 10.

Figure 3:
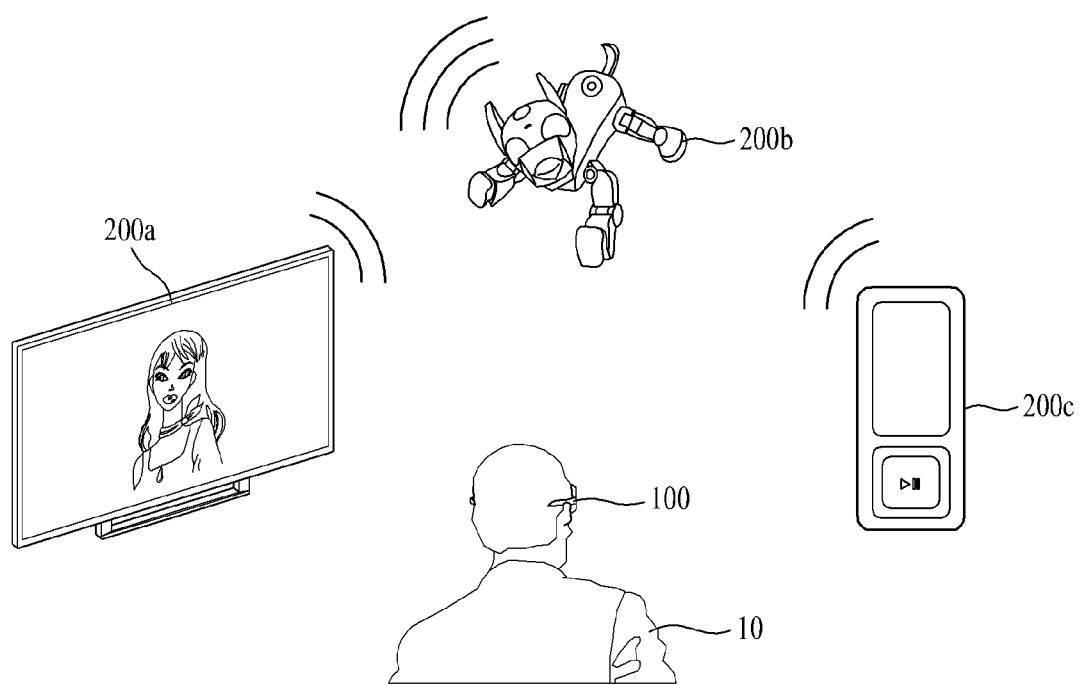
FIGS. 3 and 4 illustrate methods of outputting an audio signal of an external digital device through the HMD according to embodiments of the present invention.
Figure 3:
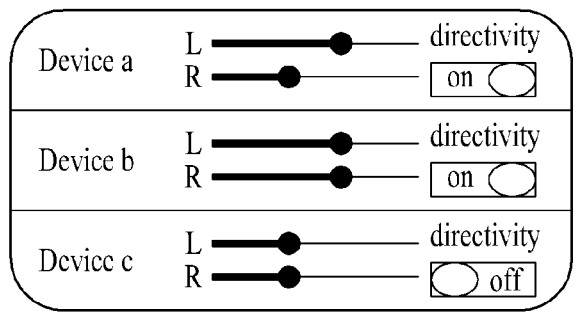
Figure 4:
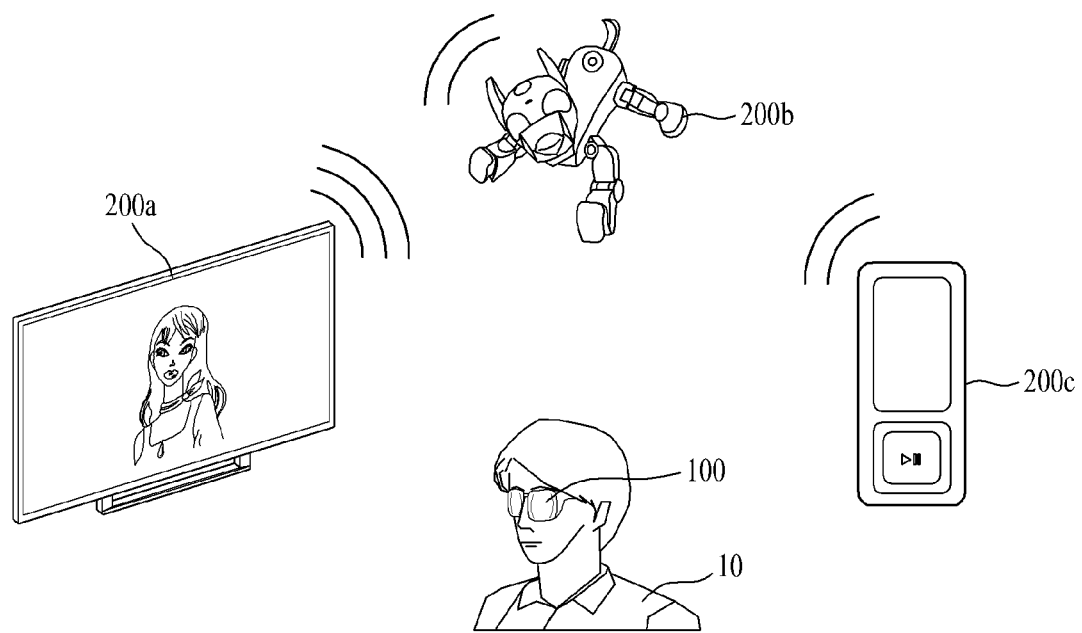
Figure 4:
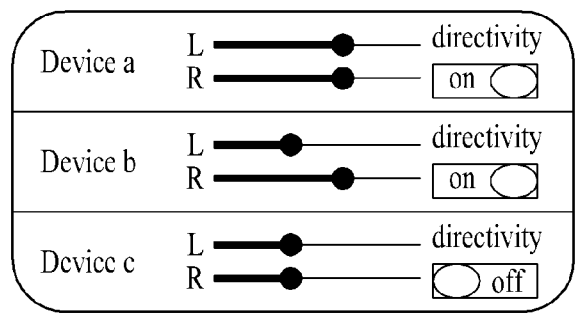

FIGS. 3 and 4 illustrates embodiments in which the HMD 100 outputs the audio signals of the external digital devices 200a, 200b and 200c based on the location information of the external digital devices 200a, 200b and 200c.

Referring to FIG. 3, the user wearing the HMD 100 looks at the external digital device 200b, that is, the robot dog. Accordingly, the external digital devices 200a, 200b and 200c are respectively located on the left, in front, and on the right of the user 10 wearing the HMD 100. The HMD 100 receives audio signals 'Device a', 'Device b' and 'Device c' of the external digital devices 200a, 200b and 200c, and outputs the received audio signals 'Device a', 'Device b' and 'Device c'. Here, the HMD 100 determines whether the audio signals 'Device a', 'Device b' and 'Device c' of the external digital devices 200a, 200b and 200c are directional output signal. If the audio signals are directional output signals, the HMD 100 detects location information of the external digital devices 200a, 200b and 200c, and outputs the audio signals based on the detected location information. However, when the audio signals are non-directional output signal, the HMD 100 outputs the audio signals at a predetermined output level regardless of the location information of the external digital devices 200a, 200b and 200c.

In the embodiment of FIG. 3, the audio signal 'Device a' of the external digital device 200a and the audio signal 'Device b' of the external digital device 200b are set such that they are output directionally (directivity 'on'), and thus the HMD 100 detects location information of the external digital devices 200a and 200b. Upon detection of the location information of the external digital devices 200a and 200b, the HMD 100 outputs the audio signals 'Device a' and 'Device b' based on the detected location information. Here, the HMD 100 can control at least one of an output level difference and an output time difference between left and right channel outputs of each audio signal based on the detected location information. For example, since the external digital device 200a is located to the left of the HMD 100 in FIG. 3, the HMD 100 can control the output level of the left channel output L of the audio signal 'Device a' to be higher than the output level of the right channel output R thereof. Furthermore, the HMD 100 can control the left channel output L of the audio signal 'Device a' to be output prior to the right channel output R. In this case, at least one of the output level difference and output time difference between the left channel output L and the right channel output R of the audio signal 'Device a' can be controlled based on the location information of the external digital device 200a. The external digital device 200b is located in front of the HMD 100, and thus the HMD 100 controls the output level and output time of the left channel output L of the audio signal 'Device b' to be equal to the output level and output time of the right channel output R of the audio signal 'Device b'.

Since the audio signal 'Device c' of the external digital device 200c is set such that it is output non-directionally (directivity 'off') in FIG. 3, the HMD 100 outputs the audio signal 'Device c' regardless of the location of the external digital device 200c. Here, the HMD 100 can set the output level and output time of the left channel output L of the audio signal 'Device c' to be equal to those of the right channel output R of the audio signal 'Device c'. In addition, the HMD 100 can output the left channel output L and the right channel output R of the audio signal 'Device c' at a predetermined output level. Accordingly, the HMD 100 can provide the audio signal 'Device c' as a background sound to the user 10.

FIG. 4 shows a case in which the user 10 looks at the external digital device 200*a*. In FIG. 4, the user 10 wearing the HMD 100 can perform videotelephony while looking the external digital device 200*a*, that is, the TV receiver. Here, the external digital device 200*a* is located in front of the user 10 wearing the HMD 100, to the right of the user 10, and behind the user 10.

The HMD 100 detects location information of the external digital devices 200*a* and 200*b* respectively corresponding to the audio signals 'Device a' and 'Device b' which are output directionally, and outputs the audio signals 'Device a' and 'Device b' based on the detected location information. Since the external digital device 200*a* is located in front of the HMD 100 in FIG. 4, the HMD 100 controls the output level and output time of the left channel output L of the audio signal 'Device a' to be equal to those of the right channel output R of the audio signal 'Device a'. The external digital device 200*b* is located to the right of the HMD 100, and thus the HMD 100 can control the output level of the right channel output R of the audio signal 'Device b' to be higher than the output level of the left channel output L of the audio signal 'Device b'. In addition, the HMD 100 can control the right channel output R of the audio signal 'Device b' to be output prior to the left channel output L thereof. Here, at least one of the output level difference and output time difference between the left channel output L and the right channel output R of the audio signal 'Device b' can be controlled based on the location information of the external digital device 200*b*.

Since the audio signal 'Device c' of the external digital device 200*c* is set such that it is output non-directionally (directivity 'off'), the HMD 100 outputs the audio signal 'Device c' regardless of change in the location of the external digital device 200*c*. That is, in the embodiment of FIG. 4, the HMD 100 can set the output levels and output time of the left channel output L and the right channel output R of the audio signal 'Device c' to be equal to those in the embodiment of the FIG. 3.

According to the embodiments of the present invention, when an audio signal which is set to be output directionally is output, the HMD 100 can output the audio signal based on location information of an external digital device corresponding to the audio signal. According to the embodiments of the present invention, the HMD 100 can convert an audio signal into a 3-dimensional (3D) audio signal based on detected location information of an external digital device, and output the 3D audio signal. Here, the 3D audio signal is a binaural audio signal having 3D effect. More specifically, the HMD 100 can generate HRTF (Head Related Transfer Function) information based on location information of an external digital device, and convert an audio signal of the external digital device into a 3D audio signal using the generated HRTF information. HRTF refers to a transfer function between a sound wave generated from a sound source located at an arbitrary position and a sound wave arriving at the tympanic membrane of an ear, and has a value depending on orientation and altitude information of the sound source. When an audio signal without directionality is filtered with an HRTF in a specific direction, a person feels as if he listens a sound from the specific direction when listening to the audio signal. Accordingly, the user 10 wearing the HMD 100 can feel as if he/she listens the audio signal 'Device a' of the external digital device 200*a* and the audio signal 'Device b' of the external digital device 200*b* from the direction in which the external digital devices 200*a* and 200*b* are located respectively.

Figure 5:
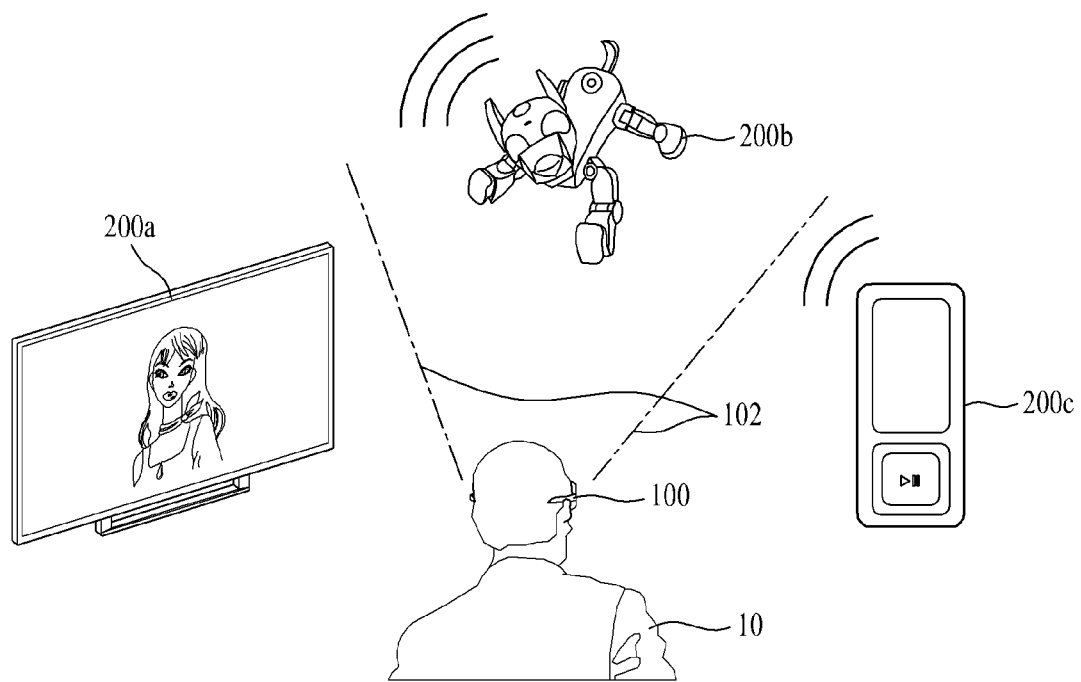
FIGS. 5 and 6 illustrate methods of outputting an audio signal of an external digital device through the HMD according to other embodiments of the present invention.
Figure 5:
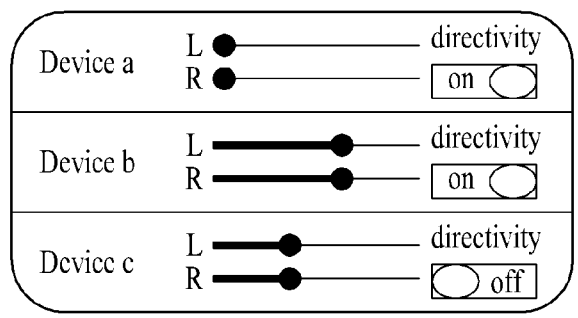
Figure 6:
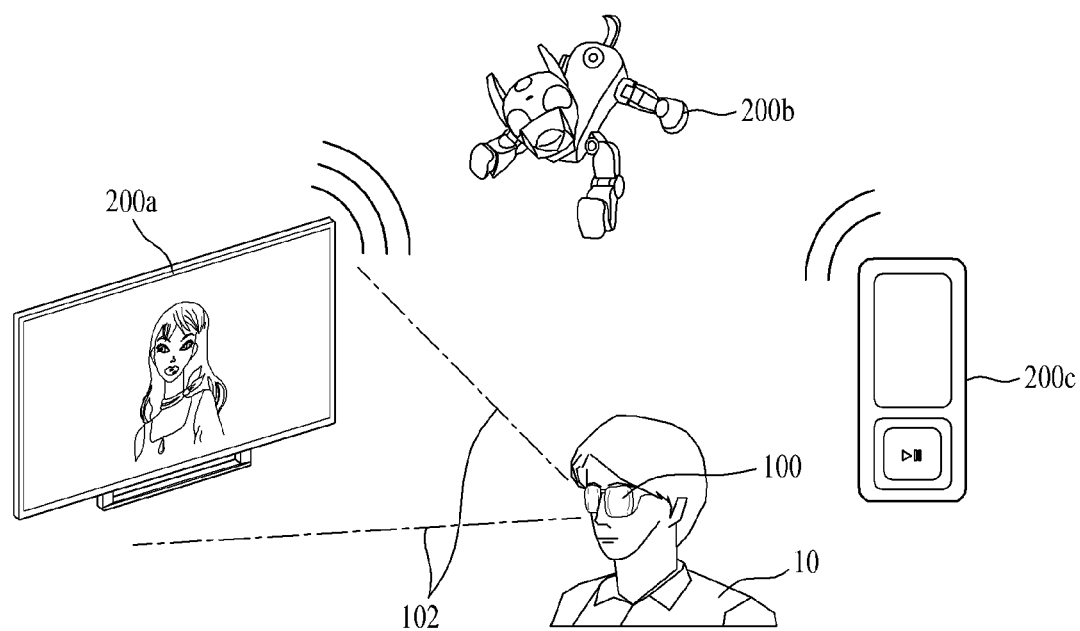
Figure 6:
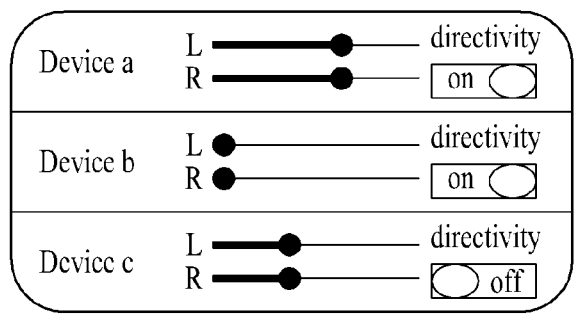

FIGS. 5 and 6 illustrate methods of outputting an audio signal according to other embodiments of the present invention. According to the embodiments of FIGS. 5 and 6, the HMD 100 can output audio signals of the external digital devices 200*a*, 200*b* and 200*c* based on location information and location states of the external digital devices 200*a*, 200*b* and 200*c*. Detailed description of parts of the embodiments of FIGS. 5 and 6, which equal or are similar to corresponding parts of embodiments of FIGS. 3 and 4 is omitted.

In the embodiments of FIGS. 5 and 6, the HMD 100 receives the audio signals 'Device a', 'Device b' and 'Device c' of the external digital devices 200*a*, 200*b* and 200*c*, and determines whether the received audio signals 'Device a', 'Device b' and 'Device c' are directional output signal. Then, the HMD 100 detects location information of the external digital devices 200*a* and 200*b* corresponding to the audio signals 'Device a' and 'Device b' that are output directionally. In addition, the HMD 100 detects location states of the external digital devices 200*a* and 200*b* respectively with the location information. In the embodiments of the present invention, the location states include a first state in which an external digital device is located within the view angle 102 of the HMD 100 and a second state in which an external digital device is not located within the view angle 102 of the HMD 100. According to the embodiments of the present invention, the HMD 100 can obtain location states of the external digital devices 200*a* and 200*b* using the location information of the external digital devices 200*a* and 200*b*. Upon detection of the location information and location states of the external digital devices 200*a* and 200*b*, the HMD 100 outputs the audio signals 'Device a' and 'Device b' based on the detected location information and location states. Here, the HMD 100 can control output levels of the audio signals 'Device a' and 'Device b' based on the location states of the external digital devices 200*a* and 200*b*.

According to the embodiment of FIG. 5, the external digital device 200*a* is not located within the view angle 102 of the HMD 100 (that is, a second state), whereas the external digital device 200*b* is located within the view angle 102 of the HMD 100 (that is, a first state). In this case, the HMD 100 outputs the audio signal 'Device b' of the external digital device 200*b* located within the view angle 102 thereof based on the location information of the external digital device 200*b*. That is, the HMD 100 can control at least one of the output levels and output time of the left channel output L and the right channel output R of the audio signal 'Device b' based on the location information of the external digital device 200*b* while outputting the audio signal 'Device b' at a normal output level. However, the HMD 100 can block output of the audio signal 'Device a' of the external digital device 200*a* which is not located within the view angle thereof. According to another embodiment of the present invention, the HMD 100 can decrease the output levels of the left channel output L and the right channel output R of the audio signal 'Device a' to be less or equal to predetermined level while outputting the audio signal 'Device a'. Accordingly, the user 10 can selectively listen the audio signal 'Device a' of the external digital device 200*b* that he/she watches.

When the user 10 wearing the HMD 100 looks at the external digital device 200*a*, as shown in FIG. 6, the external digital device 200*a* is located within the view angle 102 of the HMD 100 (that is, a first state) and the external digital device 200*b* is not located within the view angle 102 of the HMD 100 (that is, a second state). Accordingly, the HMD 100 can block the output of the audio signal 'Device b' of the external digital device 200b that is not located within the view angle 102 of the HMD 100 or decrease the output levels of the left channel output L and the right channel output R of the audio signal 'Device b' to a predetermined level or lower. The HMD 100 outputs the audio signal 'Device a' of the external digital device 200a located within the view angle 102 of the HMD 100 based on the location information of the external digital device 200a. That is, the HMD 100 can control at least one of the output levels and output time of the left channel output L and the right channel output R based on the location information of the external digital device 200a while outputting the audio signal 'Device a' at a normal output level. Accordingly, the user 10 can selectively listen the audio signal 'Device a' of the external digital device 200a that he/she watches.

In the embodiments of FIGS. 5 and 6, since the audio signal 'Device c' of the external digital device 200c is set such that it is output non-directionally (directivity 'off'), the HMD 100 outputs the audio signal 'Device c' regardless of the location of the external digital device 200c. That is, the HMD 100 can provide the audio signal 'Device c' as a background sound to the user 10 as in the embodiment of FIG. 3.

Figure 7:
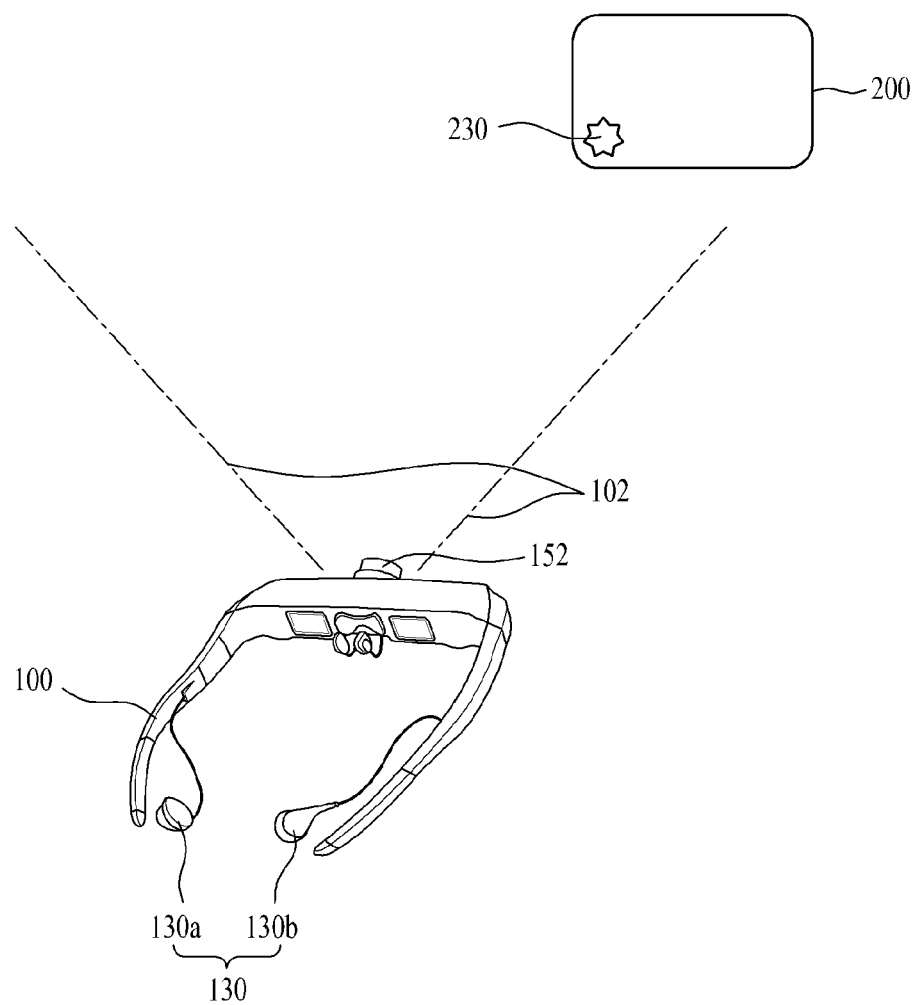
FIG. 7 illustrates a method of detecting location information of an external digital device through the HMD and outputting an audio signal based on the detected location information according to an embodiment of the present invention.

FIG. 7 illustrates a method for detecting location information of an external digital device 200 through the HMD 100, and outputting an audio signal based on the detected location information according to an embodiment of the present invention.

According to an embodiment of the invention, the HMD 100 can detect the location information of the external digital device 200 using a camera unit 152. For example, the HMD 100 can detect an image of the external digital device 200 located within the view angle 102 of the HMD 100 using the camera unit 152, and obtain the location information of the external digital device 200 using the detected image. According to another embodiment of the present invention, the HMD 100 can detect a marker 230 corresponding to the external digital device 200 using the camera unit 152, and obtain the location information of the external digital device 200 using the detected marker 230. In the embodiment of the present invention, the marker 230 is an identifier for indicating the external digital device 200 and can include a barcode, a QR code, RFID, a color code, an image code, etc. According to another embodiment of the present invention, the marker 230 can include an optical pattern output from the external digital device 200. The external digital device 200 connected to the HMD 100 can output a predetermined optical pattern and the HMD 100 can detect the optical pattern using the camera unit 152. Here, the optical pattern includes at least one of a temporal pattern and a spatial pattern.

According to another embodiment of the present invention, the HMD 100 can detect the location information of the external digital device 200 using at least one antenna (not shown). For example, the HMD 100 can include a plurality of antennas, and transmit/receive data to/from the external digital device 200 through the plurality of antennas. In this case, the HMD 100 can detect the location information of the external digital device 200 connected thereto using a time difference, a phase difference, etc. of signals transmitted/received through the plurality of antennas respectively. According to another embodiment of the present invention, the HMD 100 can include a directional antenna and detect the location information of the external digital device 200 using a signal transmitted/received through the directional antenna.

If HMD 100 detects the location information of the external digital device 200, the HMD 100 can detect the location state of the external digital device 200 based on the detected location information. According to the embodiment of the present invention, the HMD 100 can output an audio signal of the external digital device 200 to the audio output unit 130 based on the detected location information and location state. Here, the HMD 100 converts the audio signal of the external digital device 200 into a 3D audio signal using the detected location information. That is, the HMD 100 controls the left channel output and the right channel output of the audio signal, which are respectively output to the left channel output unit 130a and the right channel output unit 130b, based on the location information.

Figure 8:
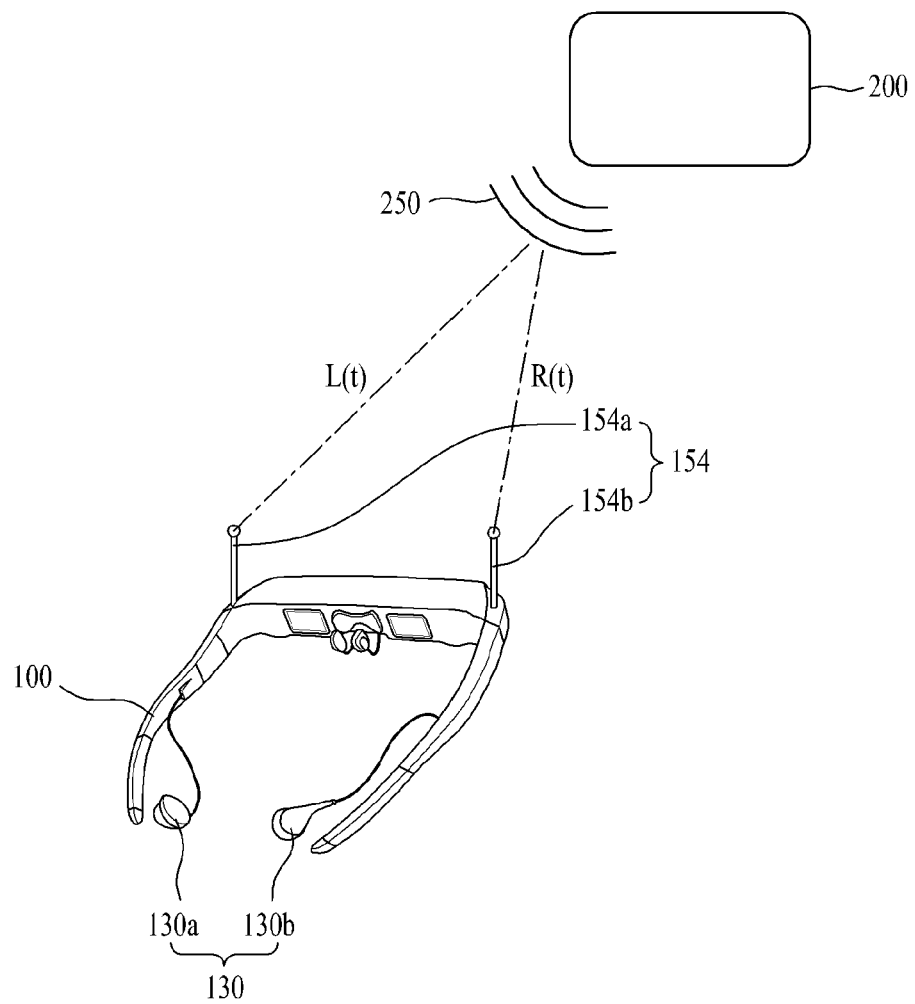
FIG. 8 illustrates a method of outputting an audio signal of an external digital device according to another embodiment of the present invention.

FIG. 8 illustrates a method of outputting an audio signal of the external digital device 200 through the HMD 100 according to another embodiment of the present invention.

Referring to FIG. 8, the HMD 100 can include a left channel receiving unit 154a and a right channel receiving unit 154b for receiving an audio signal 250 of the external digital device 200. The HMD 100 outputs the audio signal 250 received through the left channel receiving unit 154a to the left channel output unit 130a, and outputs the audio signal 250 received through the right channel receiving unit 154b to the right channel output unit 130b in real time. Here, a time difference $\Delta t$ can be generated between time L(t) at which the left channel output unit 130a receives the audio signal 250 and time R(t) at which the right channel output unit 130b receives the audio signal 250. The time difference $\Delta t$ can indicate a difference between the time at which the audio signal 250 output from the external digital device 200 arrives at the left ear of the user wearing the HMD 100 and the time at which the audio signal 250 arrives at the right ear of the user. The HMD 100 according to the present invention can reflect the time difference $\Delta t$ in the audio signal 250 and output the audio signal 250 by outputting the audio signal 250, which is respectively received through the left channel receiving unit 154a and the right channel receiving unit 154b, to the left channel output unit 130a and the right channel output unit 130b in real time. In addition, according to the embodiment of the present invention, the HMD 100 can control at least one of the output time difference and output level difference between the left channel output and the right channel output of the audio signal 250 using the time difference $\Delta t$.

According to an embodiment of the present invention, the external digital device 200 can transmit the audio signal 250 as an ultrasonic signal. In this case, the HMD 100 receives the ultrasonic signal transmitted from the external digital device 200 through the left channel receiving unit 154a and the right channel receiving unit 154b, and converts the received ultrasonic signal into an audio output signal at an audible frequency. In this case, the left channel receiving unit 154a and the right channel receiving unit 154b can be ultrasonic sensors that receive ultrasonic signals. The HMD 100 converts the audio signal 250 received through the left channel receiving unit 154a to generate a left channel output, and converts the audio signal 250 received through the right channel receiving unit 154b to generate a right channel output. Then, the HMD 100 respectively outputs the generated left channel output and right channel output to the left channel output unit 130a and the right channel output unit 130b. According to the embodiment of the present invention, the HMD 100 converts and outputs the ultrasonic signals respectively received through the left channel receiving unit 154a and the right channel receiving unit 154b in real time. Accordingly, the HMD 100 can reflect the time difference $\Delta t$ between the time when the left channel receiving unit 154a receives the ultrasonic signal and the time when the right channel receiving unit 154b receives the ultrasonic signal to the audio signal 250 and output the audio signal 250. Therefore, the user wearing the HMD 100 can feel as if he/she listens the audio signal 250 from the direction in which the external digital device 200 is located. According to the embodiment of the present invention, the audio signal 250 of the external digital device 200 can be provided to the user through the HMD 100 connected with the external digital device 200 instead of being output to the outside.

FIGS. 9 to 13 show user interfaces for outputting an audio signal, which are provided by the HMD 100 according to embodiments of the present invention. In the embodiments of FIGS. 9 to 13, the HMD 100 is connected to external digital devices 200a, 200b, 200c and 200d. Also, audio signals 'Device a', 'Device b' and 'Device d' of the external digital devices 200a, 200b and 200d are set such that they are output directionally (directivity 'on'), and the audio signal 'Device c' of the external digital device 200c is set such that it is output non-directionally (directivity 'off'). The HMD 100 receives the audio signals 'Device a', 'Device b', 'Device c' and 'Device d' of the external digital devices 200a, 200b, 200c and 200d, and outputs the received audio signals. In this case, the HMD 100 detects location information and location state of the external digital devices 200a, 200b and 200d corresponding to the audio signals 'Device a', 'Device b' and 'Device d' which are output directionally, and outputs the audio signals 'Device a', 'Device b' and 'Device d' based on the detected location information and location states.

Figure 9:
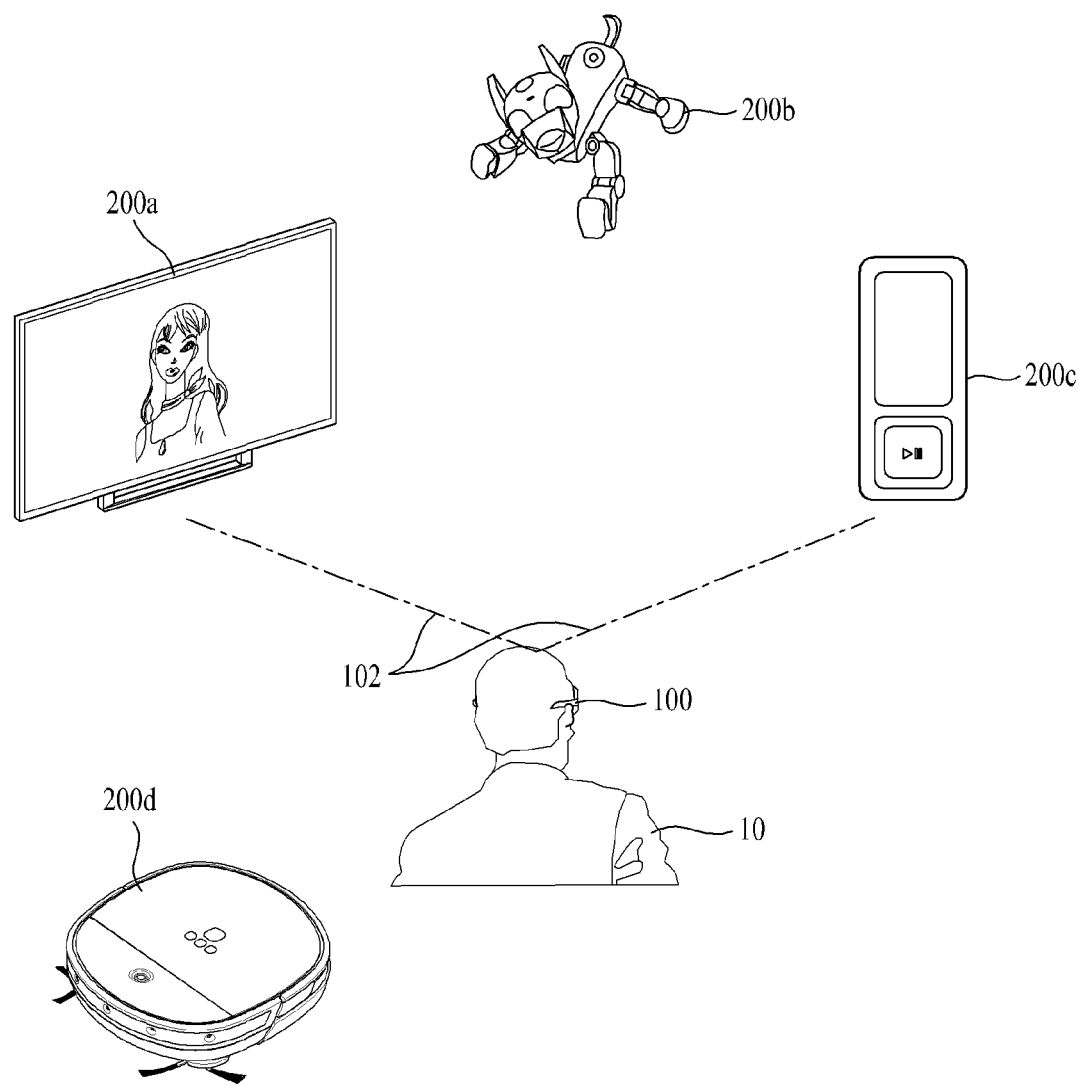
FIGS. 9 to 13 illustrate user interfaces for outputting an audio signal, which are provided by the HMD, according to embodiments of the present invention.

Referring to FIG. 9, the external digital devices 200a, 200b and 200c are located within the view angle 102 of the HMD 100 and the external digital device 200d is located outside of the view angle 102 of the HMD 100. As described above with reference to FIGS. 3 to 6, the HMD 100 according to the present invention can output an audio signal of an external digital device based on location information and location state of the external digital device.

Figure 10:
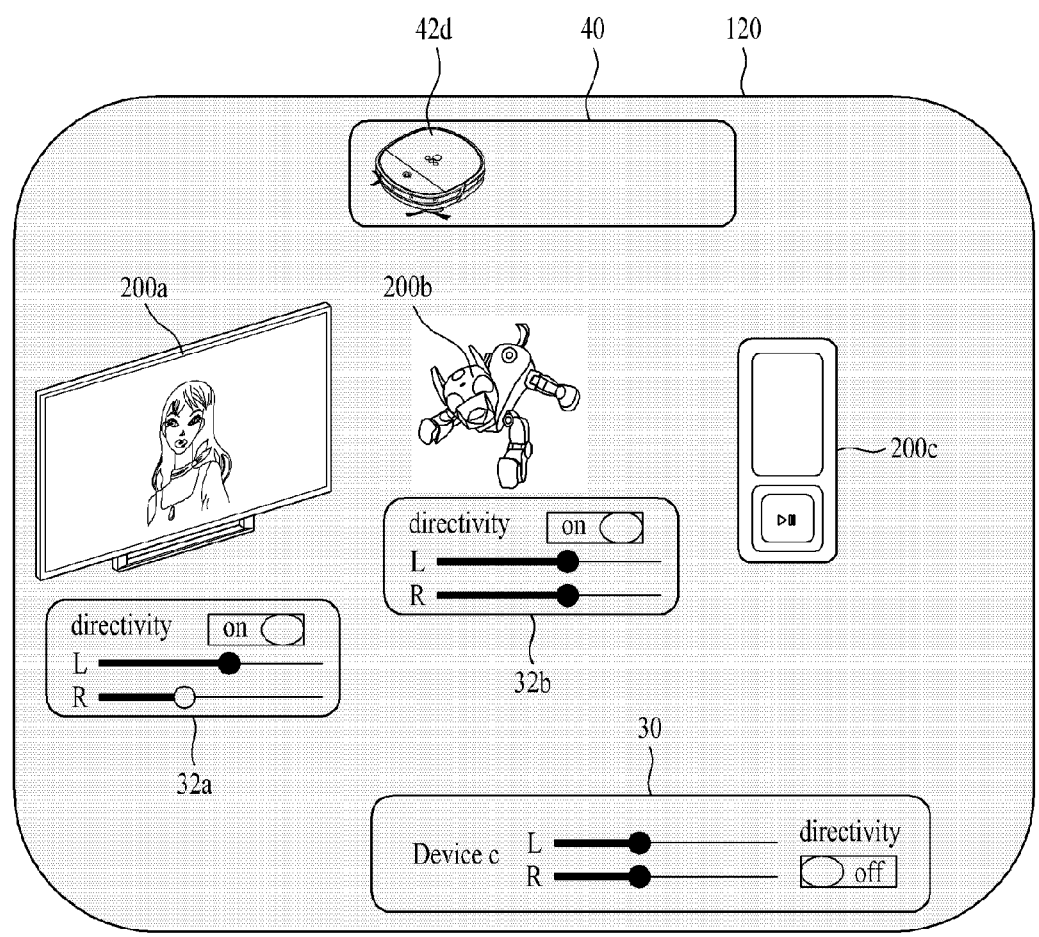

FIG. 10 shows user interfaces provided on the display unit 120 of the HMD 100 when the HMD 100 and the external digital devices 200a, 200b, 200c and 200d are arranged in the state of FIG. 9. The display unit 120 can include a display screen, and display the user interfaces on the display screen. According to another embodiment of the present invention, the display unit 120 can does not include the display screen, and project the user interface on a specific region in front of the HMD 100.

According to the embodiment of the present invention, the HMD 100 can provide audio output control interfaces for respectively controlling output of audio signals of at least one of external digital devices connected to the HMD 100. In the case of an audio signal output directionally, the HMD 100 can display an audio output control interface at position corresponding to the external digital device. As shown in FIG. 10, the HMD 100 can display audio output control interfaces 32a and 32b respectively corresponding to the audio signals 'Device a' and 'Device b' output directionally at positions respectively corresponding to the external digital devices 200a and 200b. In this case, the user wearing the HMD 100 can be provided with augmented reality information of the external digital device 200a and 200b respectively corresponding to the audio output control interfaces 32a and 32b.

Since the external digital device 200d shown in FIG. 9 is not located within the view angle 102 of the HMD 100, the HMD 100 cannot provide an audio output control interface of the audio signal 'Device d'. In this case, the HMD 100 can block output of the audio signal 'Device d', or decrease the output level of the audio signal 'Device d' to a predetermined level or lower. According to an embodiment of the present invention, the HMD 100 can provide a rear view interface 40 that virtually represents location information of an external digital device that is not located within the view angle 102 of the HMD 100. The rear view interface 40 provides an indicator indicating an external digital device that is not located within the view angle 102 of the HMD 100 among external digital devices connected to the HMD 100. In this case, the HMD 100 can display the indicator on the rear view interface 40 based on location information of the corresponding external digital device. In FIG. 10, the HMD 100 displays an indicator 42d corresponding to the external digital device 200d that is not located within the view angle 102 of the HMD 100 on the rear view interface 40. Referring to FIG. 9, since the external digital device 200d is located behind the left side of the user 10 wearing the HMD 100, the HMD 100 can display the indicator 42a on the left side of the rear view interface 40. Accordingly, the user 10 wearing the HMD 100 can detect location information of an external digital device whose audio signal output is blocked among the external digital devices connected to HMD 100.

According to the embodiment of the present invention, in the case of an audio signal output non-directionally, the HMD 100 can display an audio output control interface for an audio signal on a predetermined region. In FIG. 10, the HMD 100 displays an audio output control interface 30 corresponding to the audio signal 'Device c' output non-directionally on a predetermined region of the display unit 120.

In the present embodiment of the present invention, the HMD 100 can receive user input with respect to the audio output control interface, and independently control output of each audio signal according to the user input. For example, the HMD 100 can respectively control the output levels of left and right channel outputs of each audio signal in response to user input. According to the embodiment of the present invention, each audio output control interface can further include a user interface for converting directional output and non-directional output of the corresponding audio signal to each other. The HMD 100 can determine whether the audio signal is output directionally based on user input with respect to the user interface. User input with respect to the audio output control interface can include gesture input, voice input, touch input, etc.

Figure 11:
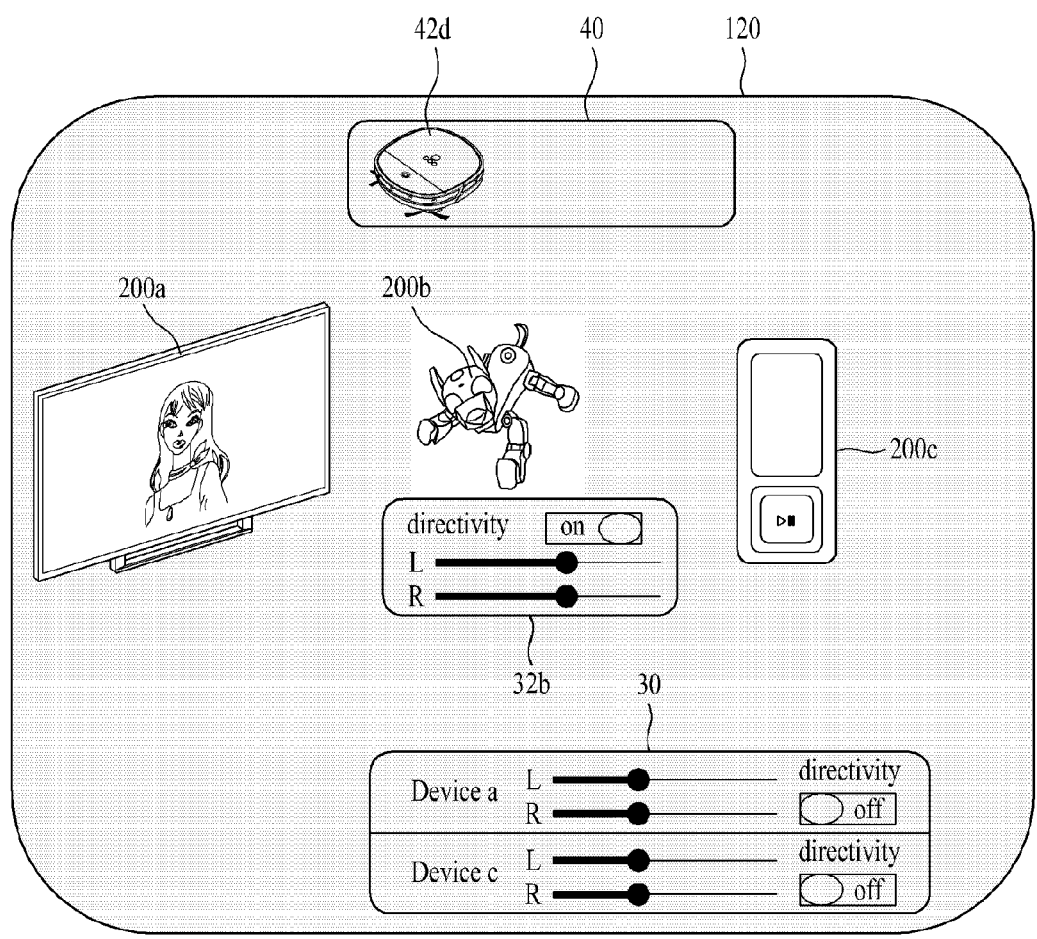

FIG. 11 shows a case in which the HMD 100 of FIG. 10 receives user input for converting directional output of the audio signal of the external digital device 200a to non-directional output. In the embodiment of FIG. 10, the HMD 100 can control output of the audio signal 'Device a' through user input with respect to the audio output control interface 32a. If the user performs user input for converting directional output (directivity 'on') to non-directional output (directivity 'off') through the audio output control interface 32a, the HMD 100 changes directional output of the audio signal 'Device a' to non-directional output in response to the user input. The HMD 100 can display the audio output control interface 30 corresponding to the audio signals 'Device a' and 'Device c' which are output non-directionally on a predetermined region.

Figure 12:
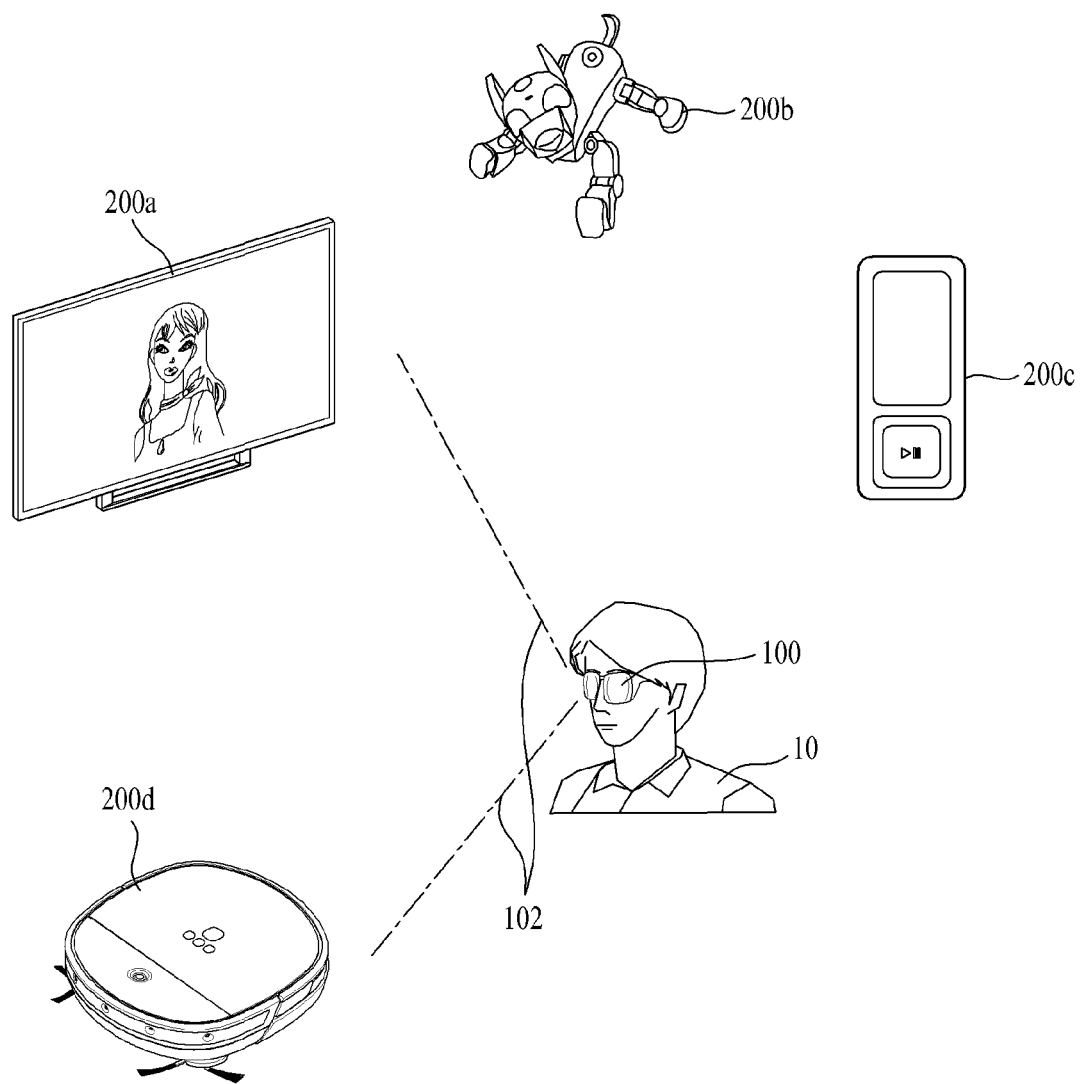

FIG. 12 shows a case in which the user 10 of FIG. 9 looks at the external digital devices 200a and 200d. In FIG. 12, the external digital devices 200a and 200d are located within the view angle 102 of the HMD 100, and the external digital devices 200b and 200c are located outside of the view angle 102 of the HMD 100. As described above with reference to FIGS. 3 to 6, the HMD 100 can output audio signals of external digital devices based on location information and location states of the external digital devices.

Figure 13:
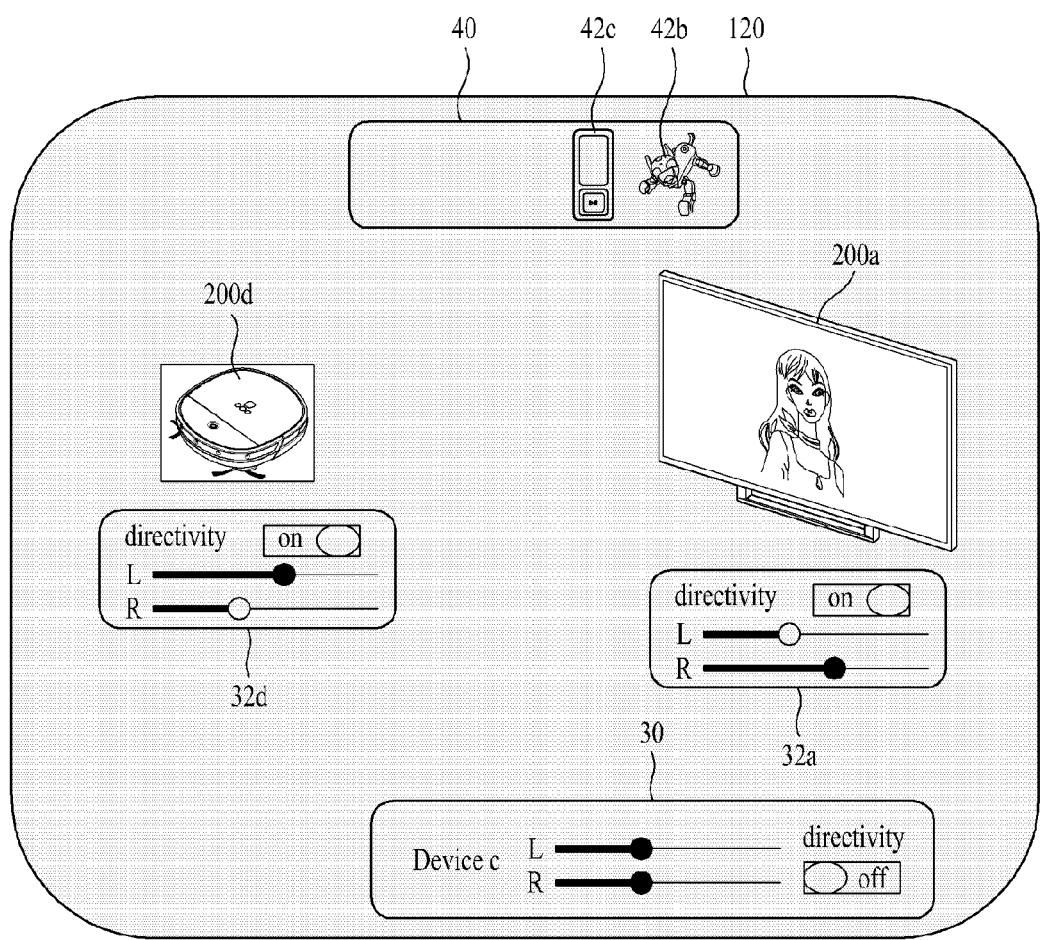

FIG. 13 shows user interfaces provided on the display unit 120 of the HMD 100 when the HMD 100 and the external digital devices 200a, 200b, 200c and 200d are arranged in the state of FIG. 12. Detailed description of parts of the embodiment of FIG. 13, which are similar or identical to corresponding parts of the embodiments of FIGS. 11 and 12, is omitted.

Referring to FIG. 13, the HMD 100 can display audio output control interfaces 32a and 32d respectively corresponding to the audio signals 'Device a' and 'Device d' which are output directionally on regions respectively corresponding to the external digital devices 200a and 200d. In the embodiment of FIG. 12, the external digital devices 200b and 200c are not located within the view angle 102 of the HMD 100, and thus the HMD 100 cannot provide audio output control interfaces corresponding to the audio signals 'Device b' and 'Device c' of the external digital devices 200b and 200c. As described above, the HMD 100 can block output of the audio signals 'Device b' and 'Device c' or decrease the output level of the audio signals 'Device b' and 'Device c' to a predetermined level or lower.

In the embodiment of FIG. 13, the HMD 100 displays indicators 42b and 42c respectively corresponding to the external digital devices 200b and 200c which are not located within the view angle 102 of the HMD 100 on the rear view interface 40. Referring to FIG. 12, since the external digital device 200b is located behind the right side of the user 10 wearing the HMD 100, the HMD 100 can display the indicator 42b on the right side of the rear view interface 40. Furthermore, since the external digital device 200c is located behind the right side of the user 10 wearing the HMD 100, the HMD 100 can display the indicator 42c at the center of the rear view interface 40.

In the case of an audio signal which is output non-directionally, the HMD 100 can display an audio output control interface corresponding to the audio signal on a predetermined region. That is, in the case of an audio signal which is output non-directionally, even if an external digital device corresponding to an audio signal is not located within the view angle 102 of the HMD 100, the HMD 100 can output the audio signal and display an audio output control interface corresponding to the audio signal. In the embodiment of FIG. 13, the HMD 100 displays the audio output control interface 30 corresponding to the audio signal 'Device c' that is output non-directionally on a predetermined region of the display unit 120.

Figure 14:
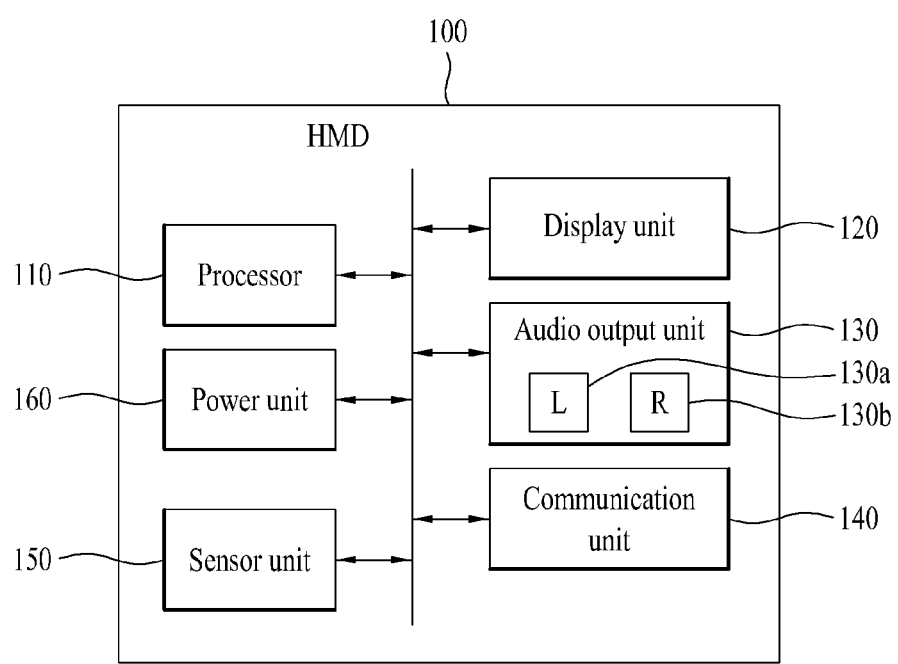
FIG. 14 is a block diagram of an HMD according to an embodiment of the present invention.

FIG. 14 is a block diagram of the HMD 100 according to an embodiment of the present invention.

Referring to FIG. 14, the HMD 100 can include a processor 110, the display unit 120, the audio output unit 130, a communication unit 140, a sensor unit 150 and a power unit 160.

The display unit 120 displays an image on a display screen. The display unit 120 displays an image based on content executed by the processor 110 or a control command of the processor 110. According to the embodiment of the present invention, the display unit 120 can display an image according to a control command of an external digital device connected to the HMD 100. For example, the display unit 120 can display content executed by an external digital device connected to the HMD 100. In this case, the HMD 100 can receive data from the external digital device through the communication unit 140, and output an image based on the received data.

The audio output unit 130 can include an audio output module such as a speaker, an earphone, etc. and a control module for controlling the same. The audio output unit 130 outputs voice based on content executed by the processor 110 or a control command of the processor 110. The audio output unit 130 of the HMD 100 according to the embodiment of the present invention includes the left channel output unit (L) 130a and the right channel output unit (R) 130b. The left channel output unit 130a and the right channel output unit 130b respectively output a left channel and a right channel of an audio signal. According to the embodiment of the present invention, the audio output unit 130 can output an audio signal of an external digital device connected to the HMD 100.

The communication unit 140 can transmit/receive data to/from an external digital device by performing communication with the external digital device using various protocols. Also, the communication unit 140 can be connected to a network in a wired or wireless manner to transmit/receive digital data such as content. In the present invention, the HMD 100 can be connected to an external digital device using the communication unit 140 and transmit/receive data to/from the external digital device connected thereto. According to an embodiment of the present invention, the communication unit 140 can include at least one antenna. The HMD 100 can detect location information of the external digital device 200 connected thereto using the at least one antenna. For example, the HMD 100 can detect the distance between the HMD 100 and the external digital device 100 connected thereto and the direction of the external digital device 100 using a time difference, a phase difference, etc. between signals transmitted/received though a plurality of antennas.

The sensor unit 150 can transmit user input or information on the environment recognized by the HMD 100 to the processor 110 using a plurality of sensors included in the HMD 100. Here, the sensor unit 150 can include a plurality of sensing means. The plurality of sensing means can include a gravity sensor, a geomagnetism sensor, a motion sensor, a gyro sensor, an acceleration sensor, an infrared sensor, an inclination sensor, a luminance sensor, an altitude sensor, an odor sensor, a temperature sensor, a depth sensor, a pressure sensor, a bending sensor, an audio sensor, a video sensor, a GPS (Global Positioning System) sensor, a touch sensor, etc. The sensor unit 150 collectively refers to the above-mentioned sensing means, can sense various user inputs and user environment, and transmit the sensed result to the processor 110 such that the processor 110 can perform an operation corresponding to the sensed result. The aforementioned sensors can be included in the HMD 100 as separate elements or integrated into one or more elements and included in the HMD 100.

According to the embodiment of the present invention, the sensor unit 150 can include a camera unit (not shown). The camera unit can detect an image within a predetermined view angle of the HMD 100 and provide the detected image to the processor 110. According to an embodiment of the present invention, the processor 110 can detect location information of an external digital device located within the view angle of the HMD 100 based on the image detected through the camera unit. The camera unit can be replaced with an infrared sensor or the like according to the purpose of the present invention.

According to the embodiment of the present invention, the sensor unit 150 can include a left channel receiving unit and a right channel receiving unit. The left channel receiving unit receives an audio signal for audio output of the left channel output unit 130a, and the right channel receiving unit outputs an audio signal for audio output of the right channel output unit 130b. The HMD 100 can output audio signals respectively received by the left channel receiving unit and the right channel receiving unit to the left channel output unit 130a and the right channel output unit 130h in real time. According to another embodiment of the present invention, an external digital device connected to the HMD 100 can transmit an audio signal as an ultrasonic signal. The HMD 100 receives the ultrasonic signal transmitted from the external digital device through the left channel receiving unit and the right channel receiving unit, and converts the received ultrasonic signal into an audio output signal at an audible frequency. Here, the left channel receiving unit and the right channel receiving unit can be ultrasonic sensors that receive ultrasonic signals. The HMD 100 converts the audio signal received by the left channel receiving unit to generate a left channel output, and converts the audio signal received by the right channel receiving unit to generate a right channel output.

The power unit 160 is an internal battery of the HMD 100 or a power source connected to an external power supply, and can supply power to the HMD 100.

The processor 110 can execute content of the HMD 100 or content received through data communication. Furthermore, the processor 100 can execute various applications and process internal data of the device. In addition, the processor 110 can control the units of the HMD 100 and control data transmission/reception between units.

FIG. 14 is a block diagram of the HMD 100 and separate blocks shown in FIG. 14 logically distinguish elements of the device. Accordingly, the elements of the device can be mounted in one chip or a plurality of chips according to device design.

Figure 15:
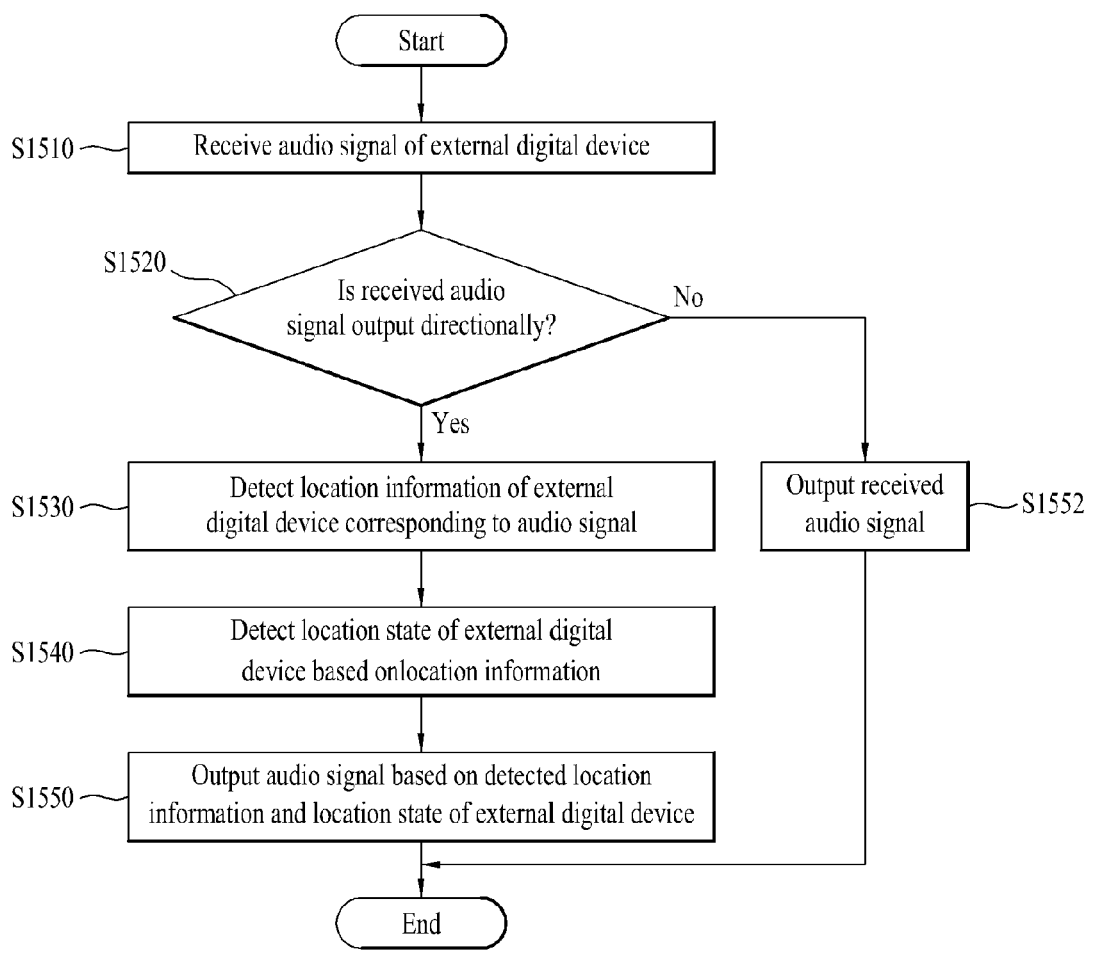
FIG. 15 is a flowchart illustrating a method of outputting an audio signal according to an embodiment of the present invention.

FIG. 15 is a flowchart illustrating a method of outputting an audio signal according to an embodiment of the present invention. Each steps of FIG. 15 can be controlled by the processor 100 of the HMD 100 shown in FIG. 14.

First, the HMD receives an audio signal of an external digital device (S1510). The HMD can receive the audio signal from the external digital device using various wired/wireless communication means. According to another embodiment of the present invention, the HMD can receive the audio signal from the external digital device using a left channel receiving unit and a right channel receiving unit included therein. In this case, the audio signal of the external digital device can be transmitted to the HMD as a sound wave such as an audible frequency or ultrasonic wave. According to an embodiment of the present invention, the HMD can further receive additional data corresponding to the received audio signal. Here, the additional data can include information representing whether an audio signal is output directionally.

Then, the HMD determines whether the received audio signal is output directionally (S1520). In the present invention, directional output refers to control of output of an audio signal in response to the location of an external digital device corresponding to the audio signal. That is, if a user listens to an audio signal that is output directionally, the user feels as if he/she listens the audio signal from the direction in which an external digital device corresponding to the audio signal is located. Non-directional output refers to output of an audio signal at a predetermined output level regardless of the location of an external digital device corresponding to the audio signal. In the embodiments of the present invention, whether an audio signal is output directionally can be determined through various methods. That is, the HMD can determine whether the audio signal is output directionally using the received additional data. Alternatively, the HMD can determine whether the audio signal is output directionally based on device information of the external digital device corresponding to the audio signal. According to another embodiment of the present invention, the HMD can determine individually whether the audio signal is output directionally based on additional user input or user setting.

If the received audio signal is output directionally, the HMD detects location information of the external digital device corresponding to the audio signal (S1530). The location information represents the relative location of the external digital device with respect to the HMD, and the HMD can detect the location information of the external digital device using various means.

According to an embodiment of the present invention, the HMD can detect location information of an external digital device using at least one antenna. For example, the HMD can include a plurality of antennas, and transmit/receive data to/from the external digital device through the plurality of antennas. In this case, the HMD can detect a relative distance between the HMD and the external digital device connected to the HMD and the direction of the external digital device using a time difference, a phase difference, etc. between signals transmitted/received through the plurality of antennas. Alternatively, the HMD can include a directional antenna, and detect the location information of the external digital device using a signal transmitted/received through the directional antenna.

According to another embodiment of the invention, the HMD can detect the location of the external digital device using a camera unit. That is, the HMD can detect an image of the external digital device located within the view angle of the HMD using the camera unit and obtain the location information of the external digital device using the detected image. Otherwise, the HMD can detect a marker corresponding to the external digital device using the camera unit, and obtain the location information of the external digital device using the detected marker. In the embodiment of the present invention, the marker is an identifier indicating the external digital device and can include a barcode, a QR code, RFID, a color code, an image code, etc. According to another embodiment of the present invention, the marker can include an optical pattern output from the external digital device. The external digital device connected to the HMD can output a predetermined optical pattern and the HMD can detect the optical pattern using the camera unit. Here, the optical pattern includes at least one of a temporal pattern and a spatial pattern.

Then, the HMD detects the location state of the external digital device based on the location information (S1540). Here, the location state includes a first state in which the external digital device is located within the view angle of the HMD, and a second state in which the external digital device is not located within the view angle of the HMD. The view angle is a predetermined region corresponding to the field of vision of the user wearing the HMD and includes an area in front of the HMD within a predetermined angle. The HMD can detect the location state of the external digital device by comparing the detected location information of the external digital device with the predetermined view angle.

According to another embodiment of the present invention, the location state of the external digital device can be determined based on the line of sight of the user wearing the HMD. The HMD can additionally include a camera unit for detecting the position of the pupil of the user wearing the HMD, and track the gaze of the user using the camera unit. Accordingly, the location state of the external digital device can be determined based on whether the external digital device is located within the field of vision of the user wearing the HMD. Here, the field of vision can include a region within a predetermined angle corresponding to the line of sight of the user wearing the HMD.

Then, the HMD outputs the audio signal based on the detected location information and location state of the external digital device (S1550). The output of the audio signal includes a left channel output and a right channel output, and at least one of the left channel output and the right channel output is controlled based on the location information and location state of the external digital device.

When the audio signal is not output directionally in step S1520, the HMD outputs the received audio signal (S1552). In this case, the HMD can output the audio signal regardless of the location information of the external digital device. The HMD can set the output level and output time of the left channel output of the received audio signal to be equal to those of the right channel output of the receive audio signal. In addition, the HMD can output the left channel output and the right channel output of the received audio signal at a predetermined output level.

Steps S1550 and S1552 correspond to the embodiments described above with reference to FIGS. 3 to 6.

The HMD described in the present invention can be changed or replaced by various devices according to the purpose of the present invention. For example, the HMD includes various devices that are worn by a user to provide a display, such as an EMD (Eye Mounted Display). However, the present invention is not limited thereto.

What is claimed is:

1. A head mounted display (HMD) comprising:
a processor configured to control an operation of the HMD;
an audio output unit configured to output audio according to a command of the processor, wherein the audio output unit includes a left channel output unit and a right channel output unit;
a sensor unit configured to detect at least one external digital device connected to the HMD and transmitting whether at least one external digital device is connected to the HMD to the processor; and
a communication unit configured to transmit/receive data to/from the external digital device according to a command of the processor,
wherein the processor receives an audio signal of the external digital device,
determines whether to output the received audio signal directionally,
detects location information of the external digital device corresponding to the audio signal when the received audio signal is a directional output signal, wherein the location information represents a relative location of the external digital device with respect to the HMD,
detects a location state of the external digital device based on the location information, wherein the location state includes a first state in which the external digital device is located within a predetermined view angle of the HMD and a second state in which the external digital device is not located within the view angle of the HMD, and
outputs the audio signal based on the detected location information and location state of the external digital device, wherein the audio signal output includes a left channel output and a right channel output, wherein at least one of the left channel output and the right channel output is controlled respectively based on the location information and the location state of the external digital device for outputting directional audio sound,
wherein the processor controls an output level of the audio signal to be less than or equal to a predetermined level or blocks output of the audio signal when the location state of the external digital device corresponds to the second state.

2. The HMD of claim 1, wherein the processor provides a rear view interface, which virtually represents the location information of the external digital device, on the HMD when the location state of the external digital device corresponds to the second state.

3. The HMD of claim 1, wherein the processor controls at least one of an output level difference and an output time difference between the left channel output and the right channel output based on the location information of the external digital device.

4. The HMD of claim 1, wherein the processor converts the audio signal into a 3D audio signal based on the location of the external digital device, wherein the 3D audio signal is a binaural audio signal having 3D effect.

5. The HMD of claim 4, wherein the processor generates a head related transfer function (HRTF) information based on the location information of the external digital device, and
converts the audio signal into the 3D audio signal using the generated HRTF information.

6. The HMD of claim 1, wherein the sensor unit includes a left channel receiving unit configured to receive the audio signal for audio output of the left channel output unit and a right channel receiving unit configured to receive the audio signal for audio output of the right channel output unit,
wherein the processor controls at least one of the left channel output and the right channel output by reflecting a received time difference of the audio signal that the left channel receiving unit and the right channel receiving unit respectively receive.

7. The HMD of claim 6, wherein the audio signal of the external digital device includes an ultrasonic signal, and
the processor converts ultrasonic signals respectively received by the left channel receiving unit and the right channel receiving unit into the left channel output and the right channel output at an audible frequency and outputs the left channel output and the right channel output.

8. The HMD of claim 6, wherein the left channel output unit and the right channel output unit output the audio signal received by the left channel receiving unit and the right channel receiving unit respectively in real time.

9. The HMD of claim 1, wherein the communication unit includes at least one antenna, and
the processor detects the location information of the external digital device using a signal transmitted/received between the HMD and the external digital device through the antenna.

10. The HMD of claim 1, wherein the sensor unit further includes a camera unit,
wherein the processor detects an image of the external digital device using the camera unit, and obtains the location information of the external digital device using the detected image.

11. The HMD of claim 1, wherein the sensor unit further includes a camera unit,
wherein the processor detects a marker corresponding to the external digital device using the camera unit, and obtains the location information of the external digital device using the detected marker.

12. The HMD of claim 11, wherein the marker includes an optical pattern output from the external digital device.

13. The HMD of claim 1, wherein the processor provides an audio output control interface configured to control output of the audio signal of at least one of the external digital device, and
controls an output level of the audio signal of the external digital device based on a user input for the audio output control interface.

14. The HMD of claim 13, wherein the processor displays the audio output control interface of the audio signal at a position corresponding to the external digital device when the audio signal is output directionally.

15. The HMD of claim 13, wherein the audio output control interface includes a user interface configured to convert between directional output and non-directional output, and
converts whether the audio signal is output directionally based on a user input applied to the user interface.

16. The HMD of claim 1, wherein the processor further receives additional data corresponding to the audio signal, wherein the additional data represents whether the audio signal is output directionally.

17. The HMD of claim 1, wherein the processor determines whether the audio signal is output directionally based on device information of the external digital device corresponding to the audio signal.

18. A method of outputting an audio signal using an HMD, the method comprising:
receiving an audio signal of at least one external digital device connected to the HMD;
determining whether to output the received audio signal directionally output signal;
detecting location information of the external digital device corresponding to the audio signal when the audio signal is a directional output signal, wherein the location information represents a relative location of the external digital device with respect to the HMD;
detecting a location state of the external digital device based on the location information, wherein the location state includes a first state in which the external digital device is located within a predetermined view angle of the HMD and a second state in which the external digital device is not located within the view angle of the HMD; and
outputting the audio signal based on the detected location information and location state of the external digital device, wherein the audio signal output includes a left channel output and a right channel output, wherein at least one of the left channel output and the right channel output is controlled respectively based on the location information and the location state of the external digital device for outputting directional audio sound,
wherein the outputting the audio signal controls the output level of the audio signal to be less than or equal to a predetermined level or blocks output of the audio signal when the location state of the external digital device corresponds to the second state.

* * * * *